US011797445B2

(12) United States Patent
Moshe et al.

(10) Patent No.: US 11,797,445 B2
(45) Date of Patent: Oct. 24, 2023

(54) DATA STORAGE DEVICE AND METHOD FOR PREVENTING DATA LOSS DURING AN UNGRACEFUL SHUTDOWN

(71) Applicant: Western Digital Technologies, Inc., San Jose, CA (US)

(72) Inventors: Eran Moshe, Kfar Saba (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/542,815

(22) Filed: Dec. 6, 2021

(65) Prior Publication Data

US 2023/0176967 A1  Jun. 8, 2023

(51) Int. Cl.
  *G06F 11/10*  (2006.01)
  *G06F 12/0804*  (2016.01)
(52) U.S. Cl.
  CPC ...... *G06F 12/0804* (2013.01); *G06F 11/1068* (2013.01); *G06F 2201/82* (2013.01); *G06F 2212/1032* (2013.01)
(58) Field of Classification Search
  CPC .............................. G06F 11/10; G06F 11/1068
  USPC .................................................... 714/6.11, 24
  See application file for complete search history.

(56) References Cited

U.S. PATENT DOCUMENTS

| | | |
|---|---|---|
| 7,269,755 B2 | 9/2007 | Moshayedi et al. |
| 9,305,610 B2 | 4/2016 | Smith et al. |
| 10,139,884 B2 | 11/2018 | Pardoe |
| 10,229,019 B2 | 3/2019 | Petersen |
| 11,086,737 B2 | 8/2021 | Peltz et al. |
| 2014/0297918 A1 | 10/2014 | Lee et al. |
| 2017/0084328 A1 | 3/2017 | Hsu et al. |
| 2017/0322845 A1* | 11/2017 | Nomura ................ G06F 3/0689 |
| 2018/0253345 A1 | 9/2018 | Kim |
| 2019/0114093 A1 | 4/2019 | Roeder et al. |
| 2019/0121690 A1 | 4/2019 | Klein |
| 2019/0213075 A1* | 7/2019 | Kim .................... G06F 11/1076 |
| 2020/0097188 A1 | 3/2020 | Gunda et al. |

(Continued)

FOREIGN PATENT DOCUMENTS

JP  2003-150460 A  5/2003

OTHER PUBLICATIONS

International Search Report dated Oct. 7, 2022 for International Application No. PCT/US2022/029506.

(Continued)

*Primary Examiner* — Chae M Ko
(74) *Attorney, Agent, or Firm* — Crowell & Moring LLP

(57) ABSTRACT

A data storage device and method for preventing data loss during an ungraceful shutdown are provided. In one embodiment, a data storage device is provided comprising a volatile memory; a non-volatile memory; and a controller. The controller is configured to detect an ungraceful shutdown; and in response to detecting the ungraceful shutdown: generate a reduced set of parity bits for data stored in the volatile memory, wherein the reduced set of parity bits comprises fewer parity bits than a full set of parity bits used in a graceful shutdown; and store the data and the reduced set of parity bits in the non-volatile memory. Other embodiments are possible, and each of the embodiments can be used alone or together in combination.

20 Claims, 7 Drawing Sheets

(56) References Cited

U.S. PATENT DOCUMENTS

2021/0089394 A1     3/2021   Yu et al.
2022/0107734 A1*   4/2022   Kim ..................... G06F 3/0619

OTHER PUBLICATIONS

Written Opinion dated Oct. 7, 2022 for International Application No. PCT/US2022/029506.

* cited by examiner

DATA STORAGE DEVICE AND METHOD FOR PREVENTING DATA LOSS DURING AN UNGRACEFUL SHUTDOWN

BACKGROUND

A data storage device is typically powered by a host. So, when the host shuts down, power is removed from the data storage device. In an ideal situation, the host provides advanced warning to the data storage device about the shutdown, so the data storage device can complete any pending write operations before power is removed. This is referred to as a "graceful shutdown." However, there are situations where power is removed from the data storage device without warning (an "ungraceful shutdown"), In this situation, pending write operations will not be completed, so data held in a volatile write cache buffer will be lost. To prevent data loss in an ungraceful shutdown situation, the data storage device can be equipped with a capacitor that can provide the data storage device with power long enough for the data held in the write cache buffer to be written to the non-volatile memory.

DETAILED DESCRIPTION

Overview

Figure 1A:
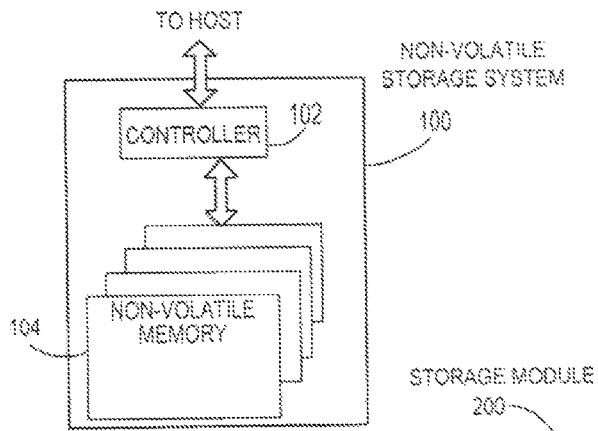
FIG. 1A is a block diagram of a data storage device of an embodiment.

By way of introduction, the below embodiments relate to a data storage device and method for preventing data loss during an ungraceful shutdown. in one embodiment, a data storage device is provided comprising a volatile memory; a non-volatile memory; and a controller. The controller is configured to detect an ungraceful shutdown; and in response to detecting the ungraceful shutdown: generate a reduced set of parity bits for data stored in the volatile memory, wherein the reduced set of parity bits comprises fewer parity bits than a full set of parity bits used in a graceful shutdown; and store the data and the reduced set of parity bits in the non-volatile memory.

In some embodiments, the controller is further configured to determine a number of parity bits to use in the reduced set of parity bits.

In some embodiments, the controller is further configured to determine the number of parity bits based on an age of the non-volatile memory.

In some embodiments, the controller is further configured to determine the number of parity bits based on a program-erase count of the non-volatile memory.

In some embodiments, the controller is further configured to determine the number of parity bits based on a history of how long the data storage device is powered down after prior ungraceful shutdowns.

In some embodiments, the controller is further configured to perform the following after the data storage device powers up after the ungraceful shutdown: read the data and the reduced set of parity bits from the non-volatile memory; generate the full set of parity bits for the data; and store the data and the full set of parity bits in the non-volatile memory.

In some embodiments, the controller is further configured to write the data and the reduced set of parity bits in an unaligned format in the non-volatile memory.

In some embodiments, the controller is further configured to write additional data in a page storing the reduced set of parity bits instead of in a new page.

In some embodiments, the data storage device comprises a capacitor, wherein a size of the capacitor is sufficient to power the data storage device long enough to store the data and the reduced set of parity bits, but not the full set of parity bits, in the non-volatile memory.

In some embodiments, the non-volatile memory comprises a three-dimensional memory.

In another embodiment, a method is provided that is performed in a data storage device comprising a volatile memory storing data and a non-volatile memory. The method comprises: detecting a power loss from a host, wherein the host did not provide advance warning of the power loss to the data storage device; determining a number of parity bits to use to protect the data, wherein the number is less than a number of parity bits used to protect the data in a situation wherein the host provides advance warning of the power loss to the data storage device; and storing the data with the determined number of parity bits in the non-volatile memory.

In some embodiments, the number of parity bits is determined based on an age of the non-volatile memory.

In some embodiments, the number of parity bits is determined based on a program-erase count of the non-volatile memory.

In some embodiments, the number of parity bits is determined based on power loss history of the data storage device.

In some embodiments, the method further comprises reading the data and the determined number of parity bits from the non-volatile memory; generating a full set of parity bits for the data; and storing the data and the full set of parity bits in the non-volatile memory.

In some embodiments, the reading, generating, and storing are performed in a mounting process after power up.

In some embodiments, the data and the determined number of parity bits are written in an unaligned format in the non-volatile memory.

In some embodiments, the method further comprises storing additional data in a same page as the determined number of parity bits rather than in a new page.

In some embodiments, the data storage device further comprises a capacitor configured to power the data storage device long enough to store the data and the determined number of parity bits in the non-volatile memory.

In another embodiment, a data storage device is provided comprising: a volatile memory; a non-volatile memory; and means for flushing data from the volatile memory to the non-volatile memory in response to an ungraceful shutdown using a fewer parity bits than are used when flushing data in response to a graceful shutdown.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
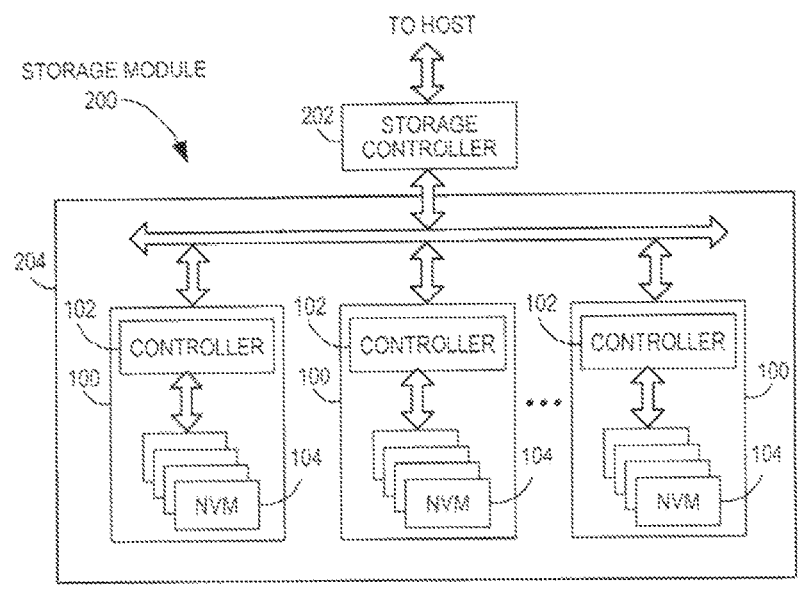
FIG. 1B is a block diagram illustrating a storage module of an embodiment.
Figure 1C:
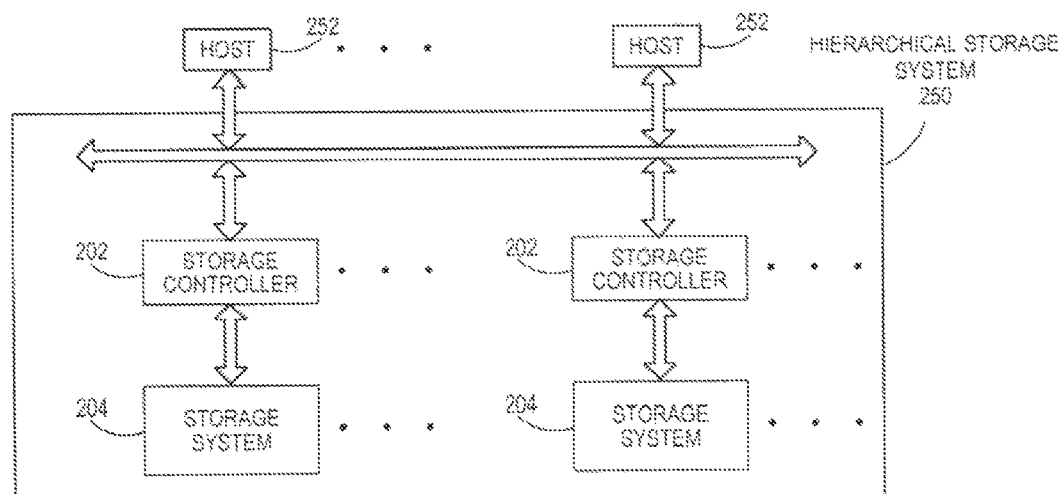
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
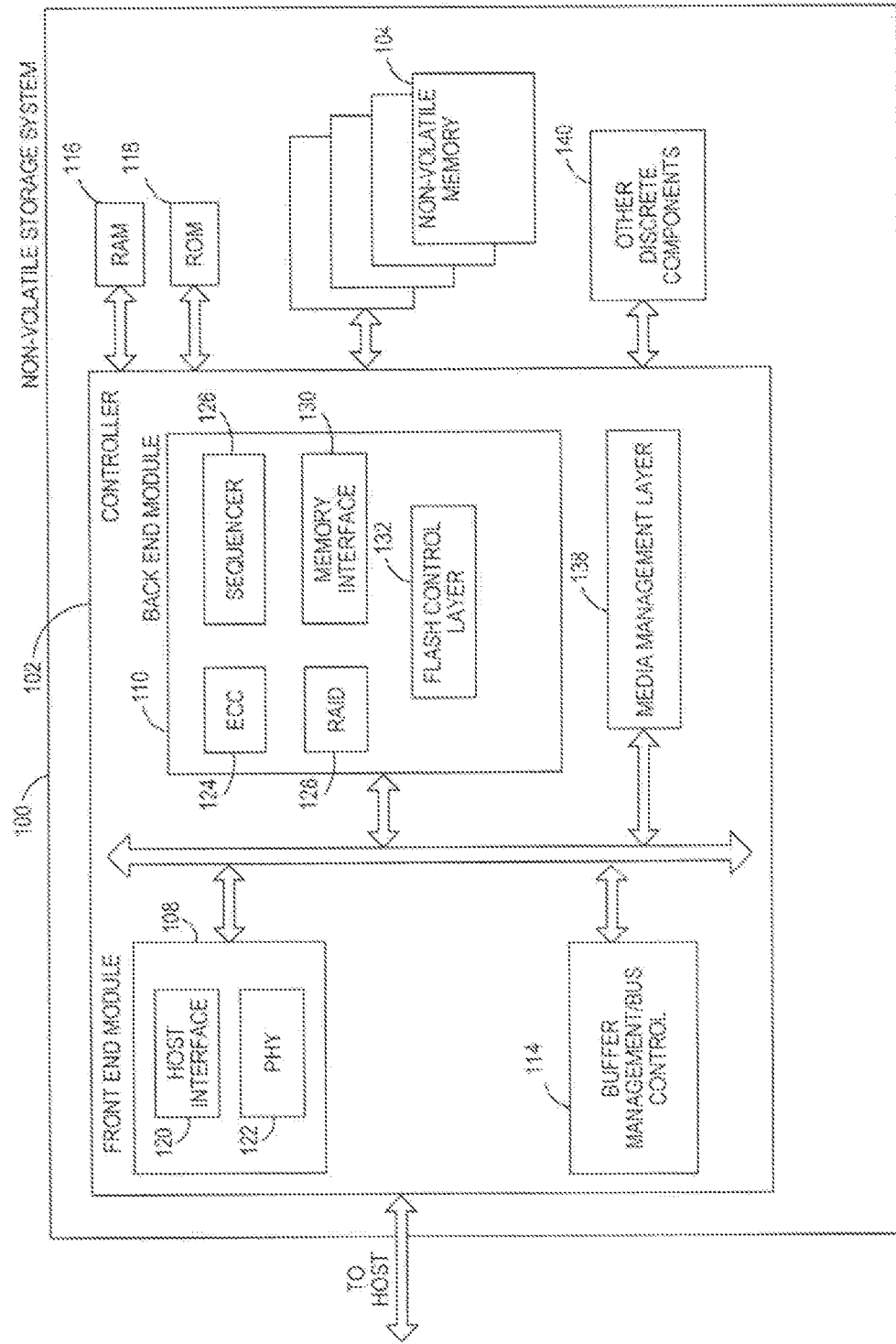
FIG. 2A is a block diagram illustrating components of the controller of the data storage device illustrated in FIG. 1A according to an embodiment.
Figure 2B:
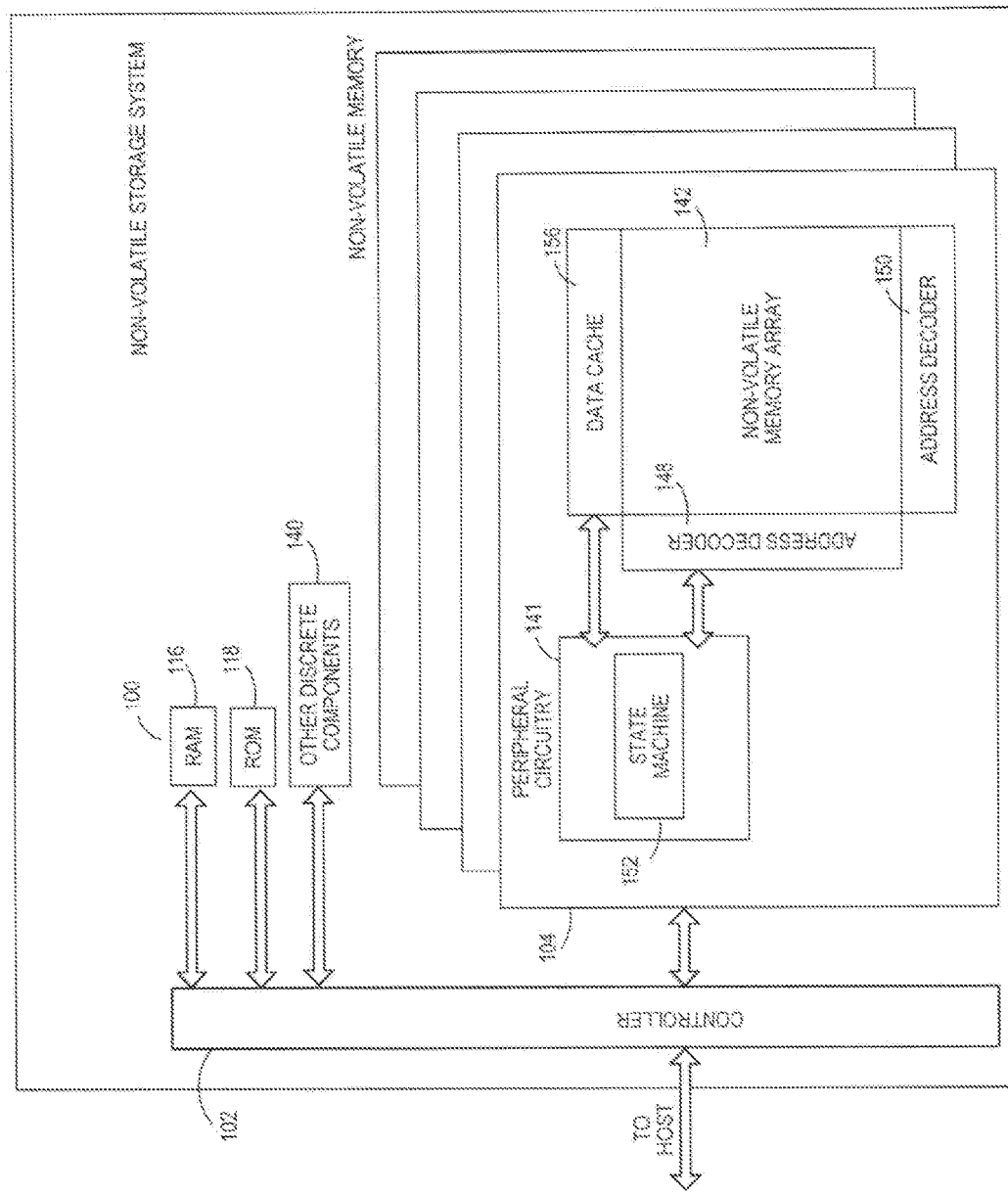
FIG. 2B is a block diagram illustrating components of the memory data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

FIG. 213 is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including RDRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL, translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 2C:
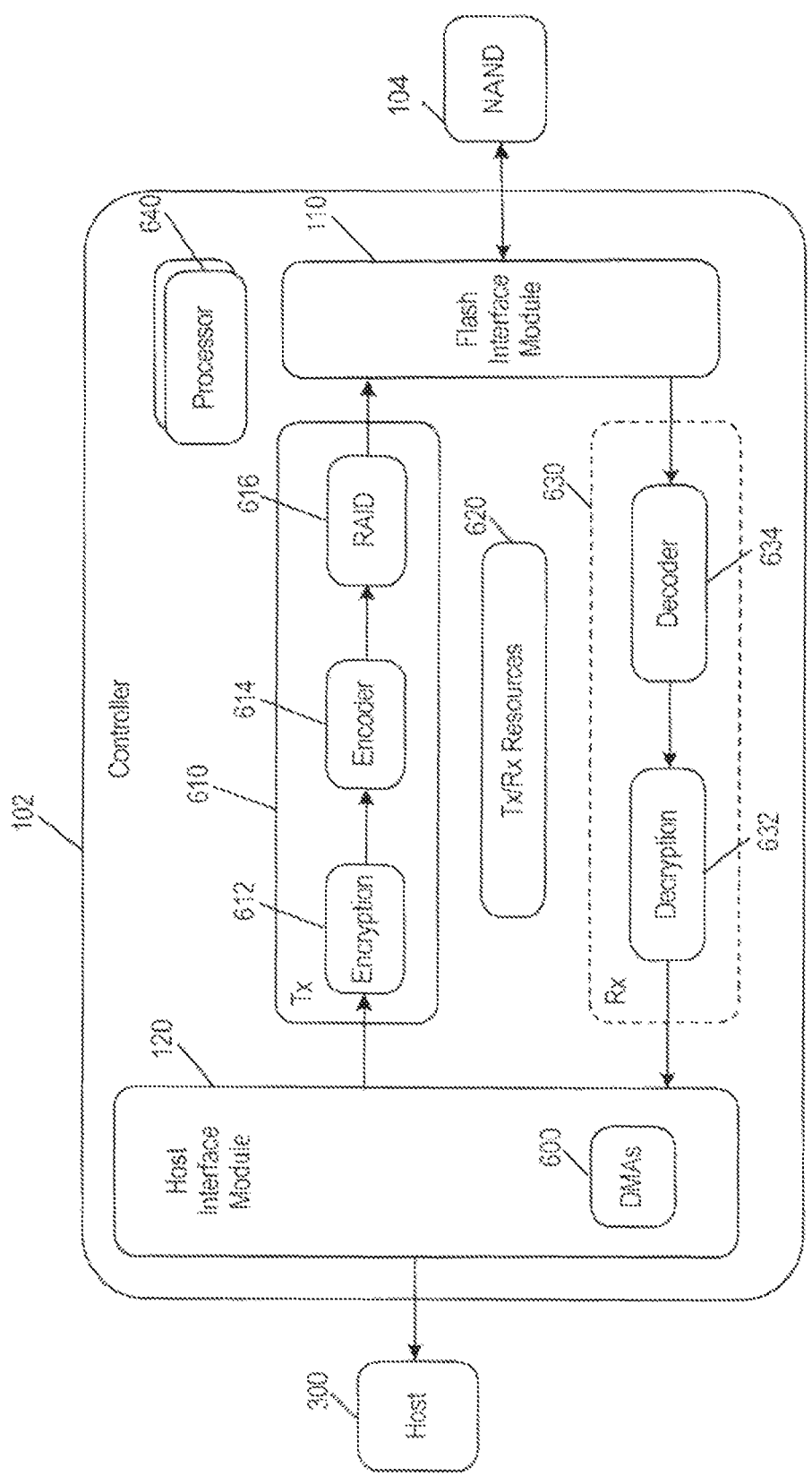
FIG. 2C is a block diagram of a controller of a data storage device of an embodiment.

FIG. 2C illustrates one particular example of the controller 102. It should be understood that this is merely an example and other implementations of the controller 102 can be used. As shown in FIG. 2C, in this example, the controller 102 comprises a host interface module 120 with direct memory access modules (DMAs) 600, a flash interface module 140, and transfer and receive paths 610, 630 with supporting transfer/receive resources 620, as well as one or more processors 640. The transfer path 610 comprises an encryption module 612, an encoder 614, and a RAID module 616. The receive path 630 comprises a decoder 634 and a decryption module 632.

Figure 3:
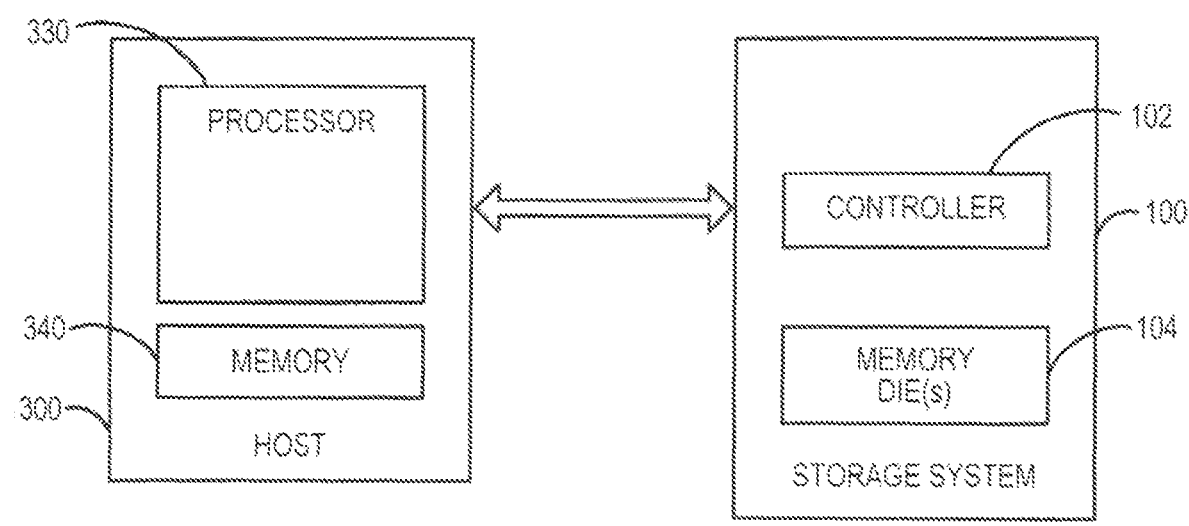
FIG. 3 is a block diagram of a host and data storage device of an embodiment.

FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As noted above, the data storage device 100 is typically powered by the host 300. So, when the host 300 shuts down, power is removed from the data storage device 100. In an ideal situation, the host 300 provides advanced warning to the data storage device 100 about the shutdown, so the data storage device 100 can complete any pending write operations before power is removed. This is referred to as a "graceful shutdown." However, there are situations where power is removed from the data storage device 100 without warning (an "ungraceful shutdown"). In this situation, pending write operations will not be completed, so data held in a volatile write cache buffer (e.g., RAM 116) will be lost. To prevent data loss in an ungraceful shutdown situation, the data storage device 100 can be equipped with a capacitor that can provide the data storage device 100 with power long enough for data held in the write cache buffer 116 to be written (flushed) to the non-volatile memory 104.

Due to the physics involved in the memory cells, there is a risk that some data stored in the non-volatile memory 104 may be corrupted or lost. To protect against this data loss, parity protection (e.g., error correction code (ECC)) can be used to generate parity bits based on the host data in the volatile memory 116, so that the host data and parity bits are stored in the non-volatile memory 104 as part of the flushing process. When the data is later read back from the non-volatile memory 104, the parity bits can be used to detect and possibly correct an error in the data.

The following embodiments recognize that, in some situations, it may be desirable to reduce the size of the capacitor used in the data storage device 100 (e.g., to reduce cost). A reduction in capacitor size may require the data to be flushed more quickly to the non-volatile memory 104. One way to do this is to forego the use of parity protection on the data. However, because the data would not be error protected and errors are known to occur in the non-volatile memory 104, foregoing parity protection may not be desirable. So, in one embodiment, instead of foregoing all parity protection, a reduced level of parity protection is used, which reduces the number of parity bits that need to be generated and stored in the non-volatile memory 104. Since less data needs to be generated and written, the time needed for the flushing process is reduced, which, in turn, allows for a smaller capacitor to be used in the data storage device 100. However, because some parity protection is provided, these embodiments reduce the data loss probability as compared to the situation where no parity protection is used at all.

When the data storage device 100 is later powered-up, the controller 102 can read the data with the reduced protection from the non-volatile memory 104, generate full parity protection for the data, and re-write the data with full parity protection back to the non-volatile memory 104.

Figure 4:
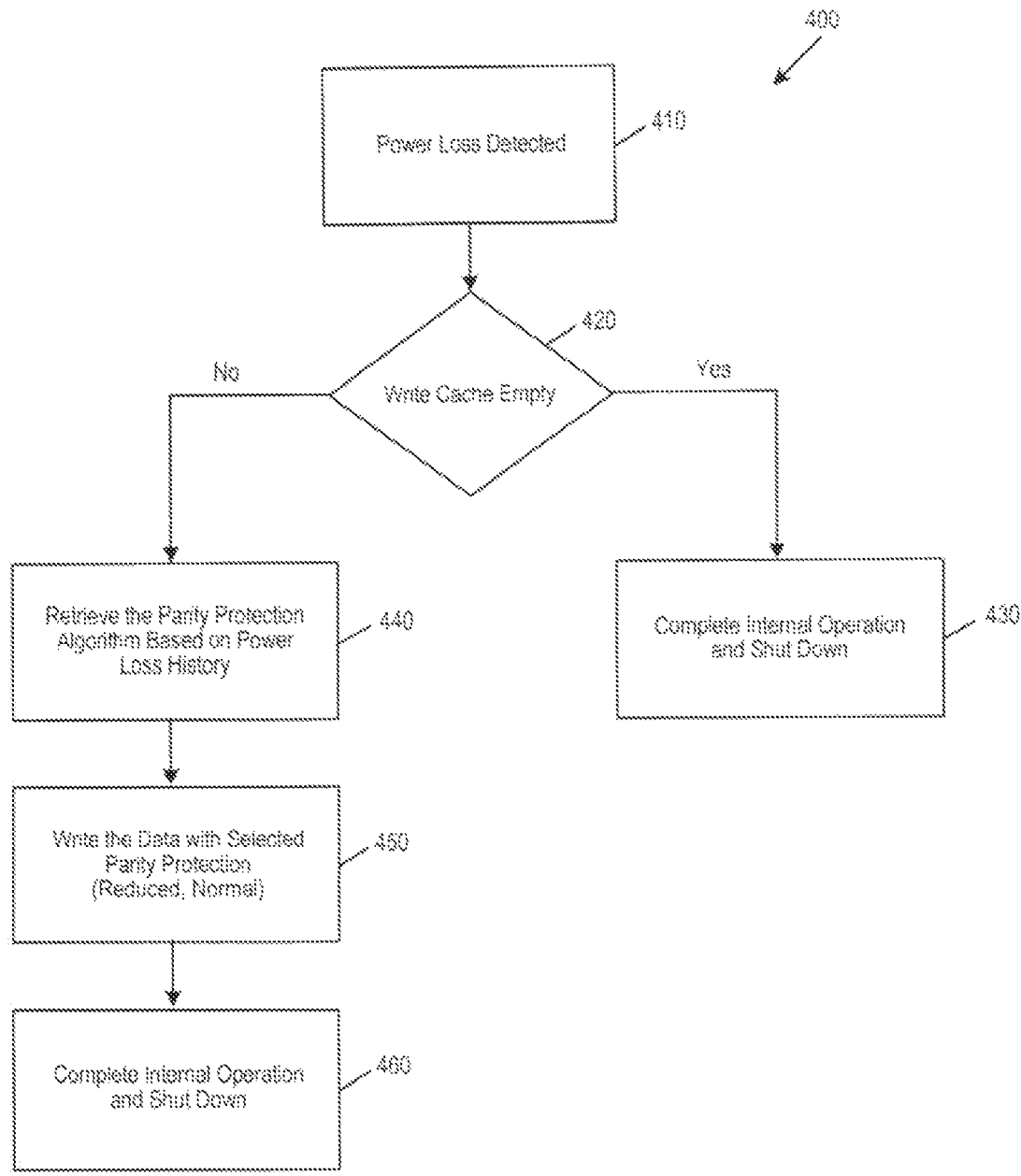
FIG. 4 is a flow chart of a method of an embodiment for preventing data loss during an ungraceful shutdown.
Figure 5:
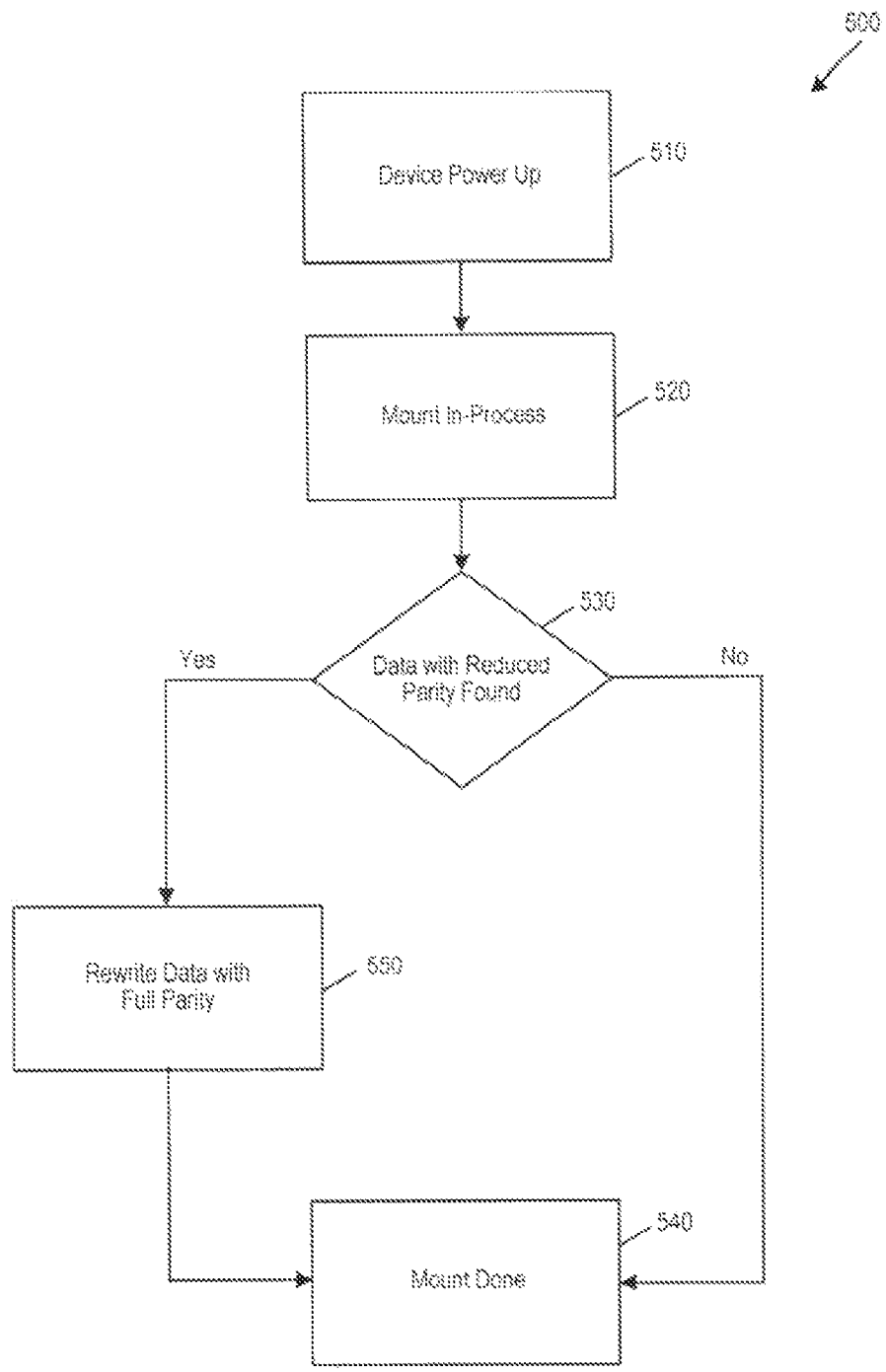
FIG. 5 is a flow chart of a method of an embodiment for mounting data storage device after power-up.

FIGS. 4 and 5 are flow charts 400, 500 that illustrate these operations. As shown in FIG. 4, after the controller 102 detects a power loss (here, due to an ungraceful shutdown) (act 410), the controller 102 determines if the write cache (e.g., RAM 116) is empty (act 420). If the controller 102 determines that the write cache is empty, the controller 102 completes the internal operation and shuts down (act 430). However, if the controller 102 determines that the write cache is not empty, the controller 102 generates the appropriate reduced set of parity bits. In this particular example, the controller 102 retrieves a parity protection algorithm based on power loss history (act 440). The controller 102 then writes the data with the selected parity protection (e.g., reduced, normal) (act 460). Then, the controller 102 completes the internal operation and shuts down (act 460).

As mentioned above, in this example, the controller 102 uses power loss history to select a level of parity protection. More specifically, ungraceful shutdown power-down history can be collected for a selected time period and then be used for understanding and selecting the parity protection that should be used when the next ungraceful shutdown is encountered. The power-down collected data can be processed to build an artificial intelligence/machine learning model that can help determine the level of parity protection to use. For example, based on time stamps, the controller 102 can determine the time between when the data storage device 100 was powered down until it was powered up, for each time there was an ungraceful shutdown. Risk of data loss increases the longer the data storage device 100 is powered down. So, if the historical time period is relatively short, the number of parity bits used can be less than if the historical time period is relatively long.

It should be noted that other mechanisms can be used to determine the reduced parity level to use. For example, the decision of how much parity protection to use can be based on the age (life time) of the data storage device 100. When the data storage device 100 is "fresh" (beginning of its life), the probability for error is very low, so a very low amount of parity can be used. Conversely, if the data storage device 100 is relatively old, the risk of data loss is greater, so more parity protection can be used. The age/life of the data storage device can be determined in any suitable way (e.g., by comparing an average program erase cycle (PEC) against a threshold or by another internal indication of the device's life time. So, the amount of parity or format used can be selected by the controller 102 among several options (e.g., depending on the controller 102 learning dynamically, using program/erase cycle, etc.).

As mentioned above, when the data storage device 100 powers back on, the controller 102 can "redo" the reduced protection operations and rewrite the data with full parity. This is shown in the flow chart 500 in FIG. 5. As shown in FIG. 5, after the data storage device 100 powers up (act 510) and starts the mounting process (act 520), the controller 102 determines if data with reduced parity is found (act 520), If data with reduced parity is not found, the mount is done (act 540). However, if the data with reduced parity is found, the controller 102 rewrites the data with full parity (act 550), and then the mount is done (act 540).

There are several alternatives that can be used with these embodiments. For example, when writing data to the non-volatile memory 104, the data and the parity bits are stored in such a way that there isn't any available room in a page when the write is complete. However, when a reduced set of parity bits is used, there will be room available in the page (because the reduced set does not take up as much space as the full set of parity bits). Instead of just keeping that available space empty, the controller 102 can store the next set of data in that partially-filled page instead of starting a new page. This change of format to change the mapping of codewords to a memory page allows the memory space is be fully utilized and eventually causes fewer writes to the memory 104. This is referred to herein as an "unaligned" format. During a later recovery (power-up) process, the controller 102 reads the flushed data in the special unaligned format and writes the data back to the memory 104 using standard format (full parity) format.

There are several advantages associated with these embodiments. For example, these embodiments can be used after an ungraceful shutdown to reduce the amount of data needed to be programmed to the non-volatile memory 104, which would allow the data to be flushed more quickly and allow the data storage device 100 to reduce the size of its capacitor, which would reduce cost. Also, while these embodiments can be used with any suitable data storage device, it may be particularly desirable for use with data storage devices for which time from power-down to power-up is limited to below full-reliability product specifications (e.g., enterprise products in a data center, which are typically powered all the time and where power-down is limited to some data center maintenance).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a volatile memory;
    a non-volatile memory; and
    a controller circiut configured to:
        detect an ungraceful shutdown; and
        in response to detecting the ungraceful shutdown:
            generate a reduced set of parity bits for data stored in the volatile memory, wherein the reduced set of parity bits comprises fewer parity bits than a full set of parity bits used in a graceful shutdown; and
            store the data and the reduced set of parity bits in the non-volatile memory.

2. The data storage device of claim 1, wherein the controller circuit is further configured to determine a number of parity bits to use in the reduced set of parity bits.

3. The storage device of claim 2, wherein the controller circuit is further configured to determine the number of parity bits based on an age of the non-volatile memory.

4. The data storage device of claim 2, wherein the controller circuit is further configured to determine the number of parity bits based on a program-erase count of the non-volatile memory.

5. The data storage device of claim 2, wherein the controller circuit is further configured to determine the number of parity bits based on a history of how long the data storage device was powered down after prior ungraceful shutdowns.

6. The data storage device of claim 1, wherein the controller circuit is further configured to perform the following after the data storage device powers up after the ungraceful shutdown:
    read the data and the reduced set of parity bits from the non-volatile memory; and
    generate the full set of parity bits for the data.

7. The data storage device of claim 1, wherein storing the data and the reduced set of parity bits in the non-volatile memory comprises writing the data and the reduced set of parity bits in an unaligned format in the non-volatile memory.

8. The storage device of claim 7, wherein the controller circuit is further configured to write additional data in a page storing the reduced set of parity bits instead of in a new page.

9. The data storage device of claim 1, further comprising a capacitor, wherein a size of the capacitor is sufficient to power the data storage device long enough to store the data and the reduced set of parity bits, but not the full set of parity bits, in the non-volatile memory.

10. The data storage device of claim 1, wherein the non-volatile memory comprises a three-dimensional memory.

11. A method comprising:
    performing the following in a data storage device comprising a volatile memory storing data and a non-volatile memory:
        detecting a power loss from a host, wherein the host did not provide advance warning of the power loss to the data storage device;
        determining a number of parity bits to use to protect the data, wherein the number is less than a number of parity bits used to protect the data in a situation wherein the host provides advance warning of the power loss to the data storage device; and
        storing the data with the determined number of parity bits in the non-volatile memory.

12. The method of claim 11, wherein the number of parity bits is determined based on an age of the non-volatile memory.

13. The method of claim 11, wherein the number of parity bits is determined based on a program-erase count of the non-volatile memory.

14. The method of claim 11, wherein the number of parity bits is determined based on power loss history of the data storage device.

15. The method of claim 11, further comprising:
    reading the data and the determined number of parity bits from the non-volatile memory; and
    generating a full set of parity bits for the data.

16. The method of claim 15, wherein the reading, generating, and storing are performed in a mounting process after power up.

17. The method of claim 11, wherein the data and the determined number of parity bits are written in an unaligned format in the non-volatile memory.

18. The method of claim 17, further comprising storing additional data in a same page as the determined number of parity bits rather than in a new page.

19. The method of claim 11, wherein the data storage device further comprises a capacitor configured to power the data storage device long enough to store the data and the determined number of parity bits in the non-volatile memory.

20. A data storage device comprising:
    a volatile memory;
    a non-volatile memory; and
    means for flushing data from the volatile memory to the non-volatile memory in response to an ungraceful shutdown using fewer parity bits than are used when flushing data in response to a graceful shutdown.

* * * * *